(12) United States Patent
Kroh

(10) Patent No.: US 11,753,349 B2
(45) Date of Patent: Sep. 12, 2023

(54) METHOD TO PREPARE A SOY HYDROLYSATE PRODUCT WITH A HIGH CONCENTRATION OF FREE AMINO ACIDS AND METHOD OF USING THE SAME

(71) Applicant: Nachurs Alpine Solutions, Corp., Marion, OH (US)

(72) Inventor: Franklin O. Kroh, Marion, OH (US)

(73) Assignee: Nachurs Alpine Solutions, Corp., Marion, OH (US)

( * ) Notice: Subject to any disclaimer, the term of this patent is extended or adjusted under 35 U.S.C. 154(b) by 318 days.

(21) Appl. No.: 17/143,822

(22) Filed: Jan. 7, 2021

(65) Prior Publication Data

US 2021/0122682 A1    Apr. 29, 2021

Related U.S. Application Data

(63) Continuation-in-part of application No. 16/325,379, filed as application No. PCT/US2017/047836 on Aug. 21, 2017, now Pat. No. 10,968,145.

(60) Provisional application No. 62/377,169, filed on Aug. 19, 2016.

(51) Int. Cl.
| | |
|---|---|
| *C05F 11/00* | (2006.01) |
| *C05G 5/23* | (2020.01) |
| *C05D 1/00* | (2006.01) |
| *C02F 3/02* | (2023.01) |

(52) U.S. Cl.
CPC ............... *C05F 11/00* (2013.01); *C02F 3/02* (2013.01); *C05D 1/00* (2013.01); *C05G 5/23* (2020.02); *C02F 2305/06* (2013.01)

(58) Field of Classification Search
CPC ... C05F 11/00; C05G 5/23; C02F 3/02; C05D 1/00
See application file for complete search history.

(56) References Cited

U.S. PATENT DOCUMENTS

| | | | | |
|---|---|---|---|---|
| 2,260,640 A | ‡ | 10/1941 | Rawling | A23L 11/34 530/37 |
| 2,460,627 A | ‡ | 2/1949 | Erkko et al. | A23J 1/14 530/37 |
| 2,732,395 A | ‡ | 1/1956 | Bolley et al. | C07F 9/117 558/14 |
| 4,070,422 A | ‡ | 1/1978 | Kolchev | C07F 9/117 558/14 |
| 4,389,425 A | ‡ | 6/1983 | Burr, II | A23C 11/103 426/31 |
| 4,618,670 A | ‡ | 10/1986 | Colmelet | A23J 3/346 426/62 |
| 5,077,062 A | * | 12/1991 | Ernster | A23L 27/50 426/63 |
| 6,811,798 B2 | ‡ | 11/2004 | Monagle | A23C 11/103 426/46 |
| 6,875,456 B2 | ‡ | 4/2005 | Delest | A23J 3/34 426/42 |
| 7,332,192 B2 | ‡ | 2/2008 | Cho | A23J 1/148 426/59 |
| 7,776,124 B2 | ‡ | 8/2010 | Binder | C05F 5/006 71/6 |
| 7,811,352 B2 | ‡ | 10/2010 | Binder | C05F 5/008 71/6 |
| 8,623,110 B2 | ‡ | 1/2014 | Bevans | C05F 11/00 71/15 |
| 9,456,621 B2 | ‡ | 10/2016 | Green | A23J 3/16 |

FOREIGN PATENT DOCUMENTS

GB    1275893 A  *  5/1972

OTHER PUBLICATIONS

Pham et al. (The preparation of protein hydrolysate from defatted coconut and soybean meals I. Effect of process variables on the amino nitrogen released and flavour development, 1983, J. Fd Technol. vol. 18, 00. 21-34) (Year: 1983).*
Colla et al. (Protein hydrolysates as biostimulants in horticulture, 2015, Scientia Horticulturae vol. 196, pp. 28-38) (Year: 2015).*
Colla G. et al., 'Protein hydrolysates as biostimulants in horticulture', 'Scientia Horticulturae', 2015. Colla G. et al. Dec. 31, 2015 (Dec. 31, 2015) abstract, 1.Introduction, 4.Agronomic response of horticultural crops.‡
Chay B. Pham, R. Del Rosario, 'The preparation of protein hydrolysate from defatted coconut and soybean meals. I. Effect of process variables on the amino nitrogen released and flavour development', J. Fd Technol., 18, 21-34, 1983. Chay B. Pham, R. R. Del Rosario Dec. 31, 1983 (Dec. 31, 1983).‡

\* cited by examiner
‡ imported from a related application

*Primary Examiner* — Youngsul Jeong
(74) *Attorney, Agent, or Firm* — Law Office of J L Simunic; Joan L. Simunic

(57) ABSTRACT

The present development is a method for producing a high concentration free amino acid soy hydrolysate composition and a method for using the resulting hydrolysate composition. The high concentration free amino acid soy hydrolysate is used to enhance the microbe population found in soil and wastewater. The enhanced microbe population can promote plant growth, particularly for use in brownfields and similar reclamation sites or on turf grasses, and can promote the digestion of sewage solids.

10 Claims, No Drawings

METHOD TO PREPARE A SOY HYDROLYSATE PRODUCT WITH A HIGH CONCENTRATION OF FREE AMINO ACIDS AND METHOD OF USING THE SAME

CROSS-REFERENCE TO PRIOR APPLICATIONS

This application is a divisional application of U.S. patent application Ser. No. 16/325,379 filed Feb. 13, 2019 currently pending, which is a national stage application, filed under 35 U.S.C. § 371, of International Patent Application No. PCT/US2017/047836 filed Aug. 21, 2017 which is a continuation of U.S. Patent Application 62/377,169 filed Aug. 19, 2016 now expired, each of which is incorporated by reference in its entirety.

FIELD OF THE INVENTION

The invention relates to a composition for a soil enrichment product and a method to use the composition to deliver a relatively high concentration of amino acids for soil reclamation, turf fertilization and wastewater treatment.

BACKGROUND OF THE INVENTION

Top soil contains a rich microflora of bacteria and fungi that provide and fix soil nutrients for growing plants and grasses. Because the majority of these bacteria and fungi are aerobic, they generally do not survive in lower soil depths.

It is common practice for mining and refining operations to excavate well below the top soil layer to reach the desired ore or mineral or fuel source. During this practice, the top soil is usually placed in one location in a large mound to be used later for soil remediation. When top soil is stored in a large mound for a long period of time the bacteria and fungi that are more than about two feet below the mound surface are killed due to lack of oxygen and nutrients. At the time the top soil is replaced onto the area to be remediated, there is significantly diminished microbial activity to fix the soil nutrients and get the plants or grasses to grow.

To counter this problem, soil remediation experts add a soil amendment which contains organic nitrogen and root colonizing fungi. The soil amendment is enriched with at least one fungus and specific nutrients to enhance grass and plant growth in the remediated area. Once these grasses and plants begin growing, classical fertilizer methods can be used. The nutrients in the soil amendment are usually organic material, such as composted turkey litter, that have some protein and amino acids to provide nutrients for the root fungi. However, it would be beneficial to the reclamation process if the soil amendment could be produced with a high concentration of free amino acids that could be readily bio-available to mycorrhizal fungi.

Many turf treatments comprise some amount of digested protein from feathers or other compost. Although these protein sources can supply amino acids, the normal treatment processing tends to destroy the free amino acids. Thus, it would be beneficial for turf treatment if the turf fertilizer could be produce with a high concentration of free amino acids that could be readily bio-available to the turf grasses.

An important part of the wastewater treatment process is treating raw sewage with aerobic microbes that digest the sewage solids. This allows the sewage to be further treated and released back into the water systems. However, because the microbes must digest the sewage solids before further wastewater processing may occur, the limiting step in the process is the solids digestion. The presence of bio-available free amino acids that can be used by the microbes is expected to enhance the microbe activity thereby decreasing the time required for sewage solid digestion and the overall time required for wastewater treatment. Thus, it would be beneficial for wastewater treatment if a product with a high concentration of free amino acids was available to wastewater microbes.

SUMMARY OF THE PRESENT INVENTION

The present development is a method for producing a high concentration free amino acid soy hydrolysate composition and a method to use the composition to deliver a relatively high concentration of amino acids for soil reclamation, turf fertilization and wastewater treatment.

DETAILED DESCRIPTION OF THE PRESENT DEVELOPMENT

The present development is a high concentration free amino acid potassium salt hydrolysate product that is prepared by allowing a vegetable protein starting material to hydrolyze for a period of time and under conditions sufficient to produce a significantly higher concentration of free amino acids than is produced using prior art methods. The high concentration free amino acid hydrolysate product may be used alone or in combination with select microbes. Using soymeal as the vegetable protein starting materials, the resulting hydrolysate product of the present invention demonstrates performance benefits as a soil amendment for reclamation sites, as a turf fertilizer, and for wastewater treatment. Specifically, the high concentration free amino acid soy hydrolysate is used to enhance the microbe population found in soil and wastewater. The enhanced microbe population can promote plant growth which is particularly useful in treatment of brownfields and similar reclamation sites, to promote growth and robustness of turf grasses, and to promote the digestion of sewage solids.

Prior art methods for preparation of soy hydrolysates from soymeal or other soy-based starting materials normally either require relatively harsh conditions that result in the degradation of any amino acids present or such mild conditions that the amino acids are present as oligopeptides and not as free amino acids. However, to maximize the efficacy of the amino acids for soil reclamation, the amino acids must be in the free state.

The high concentration free amino acid soy hydrolysate composition, hereinafter "HCAAS hydrolysate" or "hydrolysate composition", of the present invention is prepared by reacting soy meal with a diluted hydrochloric acid solution to lower the reaction mixture to a pH<1 while heating the reaction mixture to a temperature equal to or greater than 60° C. (140° F.), and more preferably at a temperature of between 100° C. (212° F.) to about 105° C. (221° F.), for a predetermined period of time of up to about forty-eight hours, and more preferably for a period of time of from about one hour to about twenty-four hours. The soy mixture is then cooled to ambient temperature and a base, such as potassium hydroxide or sodium hydroxide or aqueous ammonia, is added to raise the pH to at least pH 3. After the pH has been raised, the solution is filtered to remove any insoluble materials and the recovered liquor contains the dissolved free amino acids. The HCAAS-hydrolysate may be used in liquid form as produced or it can be dried to leave a potassium salt solid form. Typically, using the method for preparation of the HCAAS-hydrolysate composition produces a liquor that contains about 30% to about 35% dissolved solids and that has about 0.5% to about 5.0% amino nitrogen, by mass, and more preferably has a free alpha-amino acid nitrogen concentration of about 0.5% to about 3.0%, by mass, and most preferably has a free alpha-amino acid nitrogen concentration of about 1.2% to about 2.4% amino nitrogen, by mass.

Although the exact concentration of free amino acids in the finished product is dependent on the soy meal starting material, using the method of the present development, up to about 45% of the amino acids from the starting soy meal are recovered as free amino acids and the concentrations of at least 15 amino acids are at least twice as high as recovered in other prior art methods. A representative distribution of free amino acids in the HCAAS hydrolysate product using the present method and compared to a prior art method of amino acid isolation is provided in Table I.

TABLE I

| | % Dry Basis | |
|---|---|---|
| Amino Acid | Current Method | Prior Art Method |
| Alanine | 1.14 | 0.25 |
| Arginine | 1.32 | 0.19 |
| Aspartic acid | 3.43 | 0.28 |
| Cystine | 0.52 | 0.43 |
| Glutamic acid | 4.46 | 0.23 |
| Glycine | 1.32 | 0.30 |
| Histidine | 0.48 | 0.18 |
| Isoleucine | 0.41 | 0.09 |
| Leucine | 1.32 | 0.17 |
| Lysine | 1.24 | 0.19 |
| Methionine | 0.25 | 0.19 |
| Phenylalanine | 0.91 | 0.18 |
| Proline | 1.18 | 0.21 |
| Serine | 1.33 | 0.23 |
| Threonine | 0.68 | 0.16 |
| Tryptophan | 0.03 | 0.03 |
| Tyrosine | 0.48 | 0.14 |
| Valine | 0.48 | 0.10 |

Prior art method is method taught in U.S. Pat. No. 5,077,062

The high concentration free amino acid soy hydrolysate demonstrates performance benefits as a soil amendment for reclamation sites, and is particularly useful for accelerating the growth of grasses and other plants at reclamation sites or brownfields. When combined with microbes known in the art for soil reclamation, the HCAAS-hydrolysate plus microbe product enriches the soil and delivers a higher concentration of bacteria on a per dose basis than formulations of the prior art. Further, the present formulation has a lower concentration of hydrolyzed fats and acids than the formulations of the prior art maximizing the beneficial microbial content.

The recommended method of increasing the free amino acid content in the soil comprises applying the soil amendment composition, or HCAAS-hydrolysate, to the soil. The HCAAS-hydrolysate may be applied by spraying a homogeneous aqueous solution of the hydrolysate composition or by spraying a heterogeneous aqueous solution of the hydrolysate composition onto the area to be treated. Optionally, the HCAAS-hydrolysate may be dried and applied by spreading the dried form on the soil. The HCAAS-hydrolysate may be applied by itself or in combination with known fertilizer products. When the HCAAS-hydrolysate liquor is combined with a liquid fertilizer composition it is recommended to add enough HCAAS-hydrolysate to deliver a concentration of HCAAS-hydrolysate solids of from 0.01 wt % up to 5.0 wt % of the blended composition. In a preferred embodiment, a liquid solution of the HCAAS-hydrolysate is applied at a concentration of up to about 100 pounds of liquid per 1000 square feet. In a more preferred embodiment, the liquid solution of the HCAAS-hydrolysate is applied at a concentration of from about 0.1 pounds of liquid per 1000 square feet to about 40 pounds of liquid per 1000 square feet.

The high concentration free amino acid soy hydrolysate also demonstrates performance benefits as a turf fertilizer because the HCAAS-hydrolysate product can be applied through foliar feeding to deliver L-amino acids to the turf. When applied on south Florida greens-height 'Tifeagle' bermudagrass plots which were reconstructed in 2014 to USGA specifications and had organic matter content below 2.0%, the HCAAS-hydrolysate product provided better quality turf than an untreated control and demonstrated increased quality over time. Specifically, using Turfgrass quality ratings based on a 1 to 10 scale with 10=dark green turf, 1=dead/brown turf, and 6=minimally acceptable turf, and starting with three essentially evenly sized patches with quality ratings of 7.0, over a sixteen week period, turf treated with a six fluid ounce per 1000 ft$^2$ treatment of HCAAS-hydrolysate liquor every two weeks had quality ratings between 6.5 and 7.8; turf treated with a twelve fluid ounce per 1000 ft$^2$ treatment of HCAAS-hydrolysate liquor every two weeks had quality ratings between 6.9 and 8.2; and untreated turf had quality ratings between 5.5 and 7.1. Throughout the test period, ratings were up to, and at times greater than 1 rating point better for the high rate of HCAAS-hydrolysate treated turf, and the HCAAS-hydrolysate treated turf was consistently above minimally-acceptable standards for quality 'Tifeagle' bermudagrass greens.

Surprisingly, the high concentration free amino acid soy hydrolysate product also demonstrates performance benefits for wastewater treatment. Wastewater treatment facilities aerate raw sewage to allow microbial digestion processes to dissolve solids and to further treat the raw sewage in the water so the water can be released back into the water system, such as into lakes, rivers, streams and other water sources. However, these facilities normally have a limited raw sewage volume throughput so economic benefits may be realized if the rate of throughput can be increased. When used as a wastewater treatment, it is recommended that a sufficient quantity of the HCAAS-hydrolysate be added to the wastewater to deliver a concentration of from 0.01 wt % up to 5.0 wt % HCAAS-hydrolysate solids. For example, when the HCAAS-hydrolysate product is added to wastewater to deliver an HCAAS-hydrolysate solids concentration of 0.05%, the amount of total organic carbon (TOC) remaining after 7 hours is about 37% of the starting TOC, whereas wastewater that is not treated with the HCAAS-hydrolysate product has a TOC concentration of about 62% after 7 hours.

It is anticipated that the high concentration free amino acid soy hydrolysate may be combined with other components, such as a surfactant, an emulsifier, an antifoaming agent, a dispersant, or a combination thereof. These additives should be selected to not affect the basic chemistry of the HCAAS-hydrolysate. Exemplary surfactants include anionic surfactants, cationic surfactants, non-ionic surfactants, amphoteric surfactants, silicone-based surfactants, alcohol-based surfactants, lecithin and combinations of any thereof.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted. The term "ambient temperature" refers to an environmental temperature of from about 0° F. to about 120° F., inclusive. All compositional percentages are presented on a "by weight" basis, unless designated otherwise. The term "about", when referring to a value or to an amount of mass, weight, time, volume, concentration, or percentage can encompass variations of up to ±20%, as such variations are appropriate in the disclosed application.

It is understood that, in light of a reading of the foregoing description, those with ordinary skill in the art will be able to make changes and modifications to the present invention without departing from the spirit or scope of the invention, as defined herein.

What is claimed is:

1. A method of treating wastewater, the method comprising:
   (a) providing a free amino acid soy hydrolysate liquor prepared from a reaction mixture made by reacting soy meal with a diluted hydrochloric acid solution until the pH of the reaction mixture is below pH 1 and concurrently heating the reaction mixture to a temperature of at least 60° C. (140° F.) for a period of time of up to forty-eight hours, and then cooling the reaction mixture to ambient temperature and adding a base to raise the pH of the reaction mixture to at least pH 3, and then filtering the reaction mixture and recovering the free amino acid soy hydrolysate liquor;
   (b) providing wastewater containing raw sewage solids for treatment;
   (c) applying the free amino acid soy hydrolysate liquor to the wastewater to deliver from 0.01% to 5.00% by mass high concentration free amino acid soy (HCAAS)-hydrolysate solids in a hydrolysate solids in a reaction product mixture after step (c); and
   (d) allowing the free amino acid soy hydrolysate liquor to react with the wastewater for a predetermined time period in the reaction product mixture after step (c).

2. The method of claim 1 wherein the reaction mixture is heated to a temperature of between 100° C. (212° F.) and 105° C. (221° F.).

3. The method of claim 1 wherein the reaction mixture is heated for a period of time of from about one hour to about twenty-four hours.

4. The method of claim 1 wherein the base is selected from the group consisting of potassium hydroxide, sodium hydroxide, aqueous ammonia or a combination thereof.

5. The method of claim 1 wherein the free amino acid soy hydrolysate liquor contains about 30% to about 35% by mass dissolved solids.

6. The method of claim 1 wherein the free amino acid soy hydrolysate liquor has about 0.5% to about 5.0% amino nitrogen, by mass.

7. The method of claim 6 wherein the free amino acid soy hydrolysate liquor has about 1.2% to about 2.4% amino nitrogen, by mass.

8. The method of claim 1 wherein the free amino acid soy hydrolysate liquor has a percent dry basis aspartic acid concentration of at least 3% by mass and a percent dry basis glutamic acid concentration of at least 4% by mass.

9. The method of claim 1 wherein the free amino acid soy hydrolysate liquor is allowed to react with the wastewater for up to seven hours.

10. The method of claim 1 wherein the free amino acid soy hydrolysate liquor is mixed with a surfactant, an emulsifier, an antifoaming agent, a dispersant, or a combination thereof.

* * * * *